INVENTOR.
HIRAM E. TEMPLE
BY
ATTORNEYS

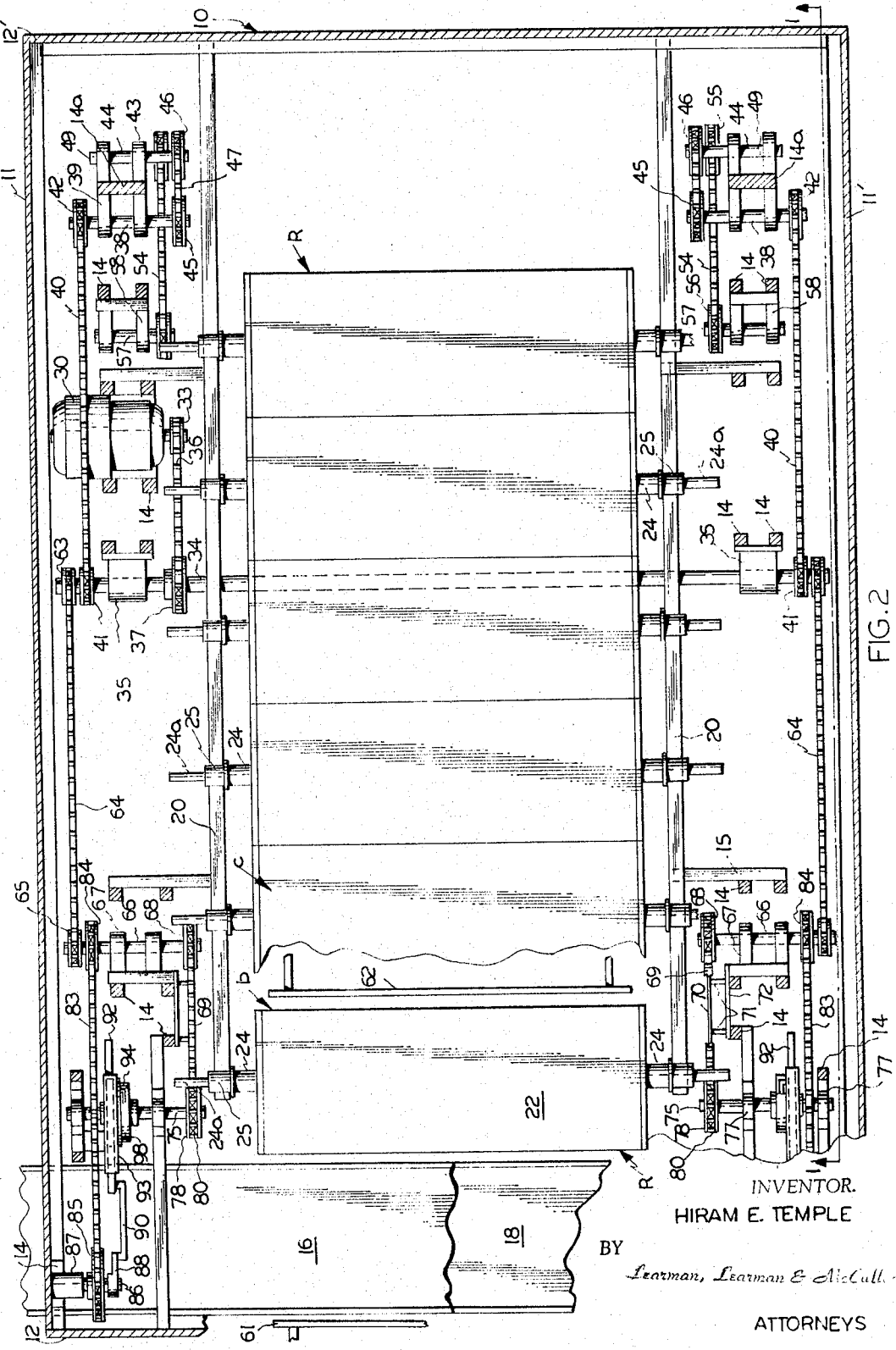

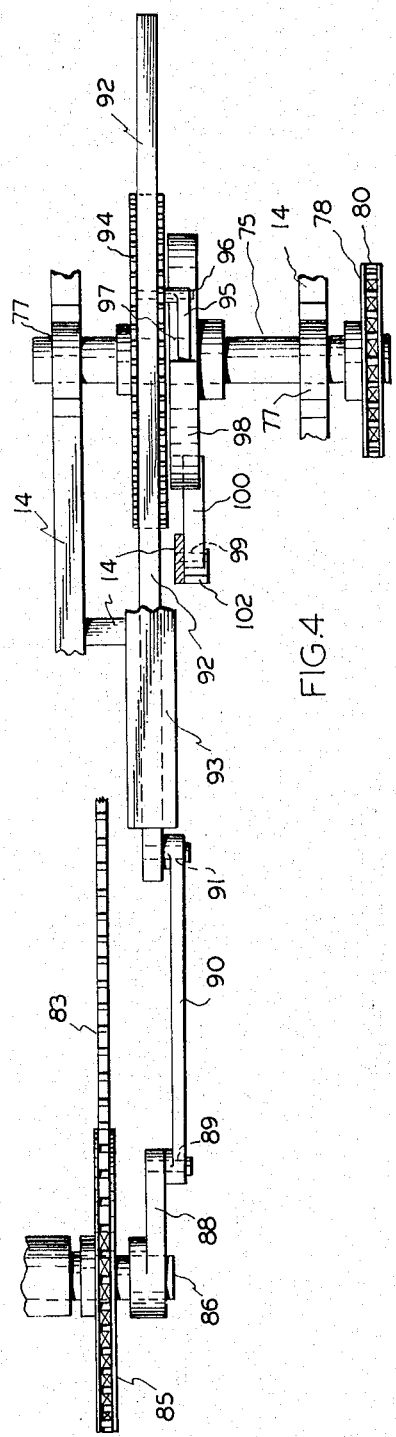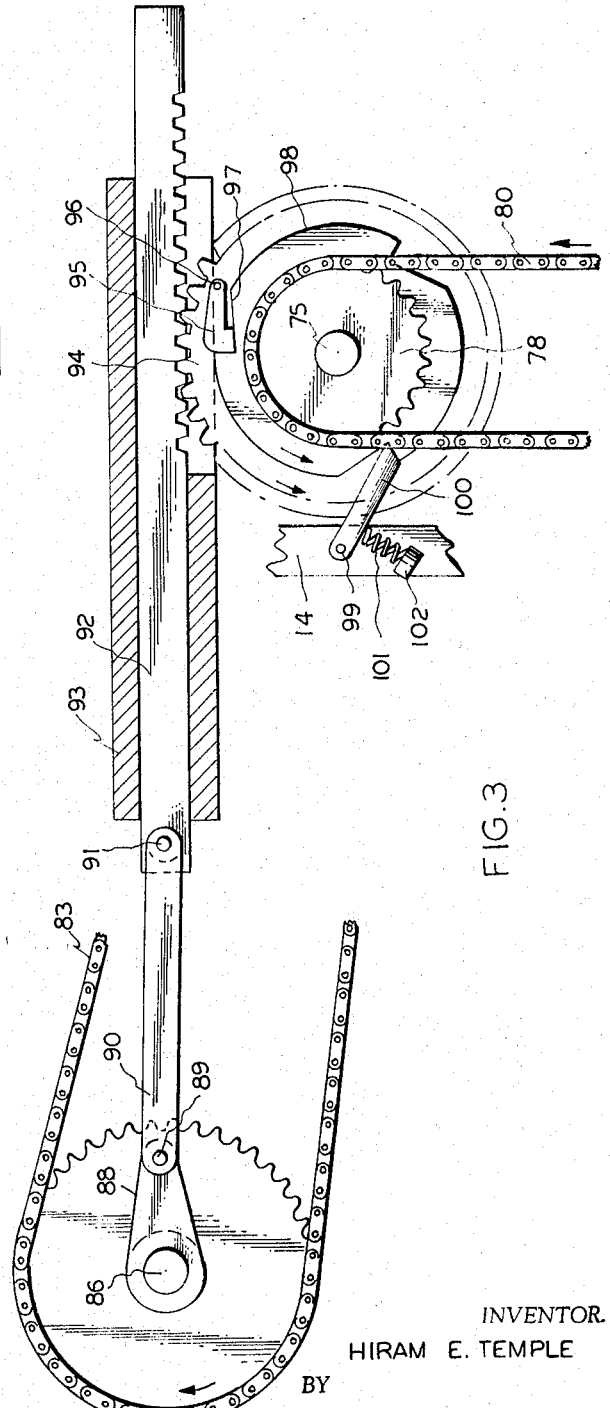

United States Patent Office 3,301,411
Patented Jan. 31, 1967

3,301,411
ELEVATOR MECHANISM FOR PRODUCT COOLING OR PROOFING SYSTEM
Hiram E. Temple, Saginaw, Mich., assignor to Baker Perkins Inc., Saginaw, Mich., a corporation of Michigan
Filed Mar. 31, 1964, Ser. No. 356,180
5 Claims. (Cl. 214—16.4)

This invention relates to systems for moving products through a bakery proofer or cooler housing circuitously to subject them for a predetermined time interval to a desired atmosphere.

More particularly, the invention relates to apparatus of the character disclosed in Temple Patent No. 2,823,811 in which a single, continuous, drive mechanism can be employed to drive the elevator, lowerator, rack advancing conveyor, and, if desired, the loading and unloading elements so that complicated and expensive electrical control circuits which have been used in the past to start and stop separate motors for driving these elements need not be employed, the system incorporating mechanism which permits the shelves of the product carrying racks to be successively stopped opposite the loading and unloading conveyors for a sufficient length of time to be loaded and unloaded even though continuous drive means is employed.

One of the prime objects of the present invention is to provide apparatus of the character described which can be operated by a continuously driven, single motor in a simple, efficient and inexpensive manner to thereby permit such a system to be manufactured and sold at a lower cost than previously and to be maintained more economically.

Another object of the invention is to provide apparatus of the character described incorporating rack elevating drive shaft means which is continuously driven, the system providing for the movement of the elevator chains intermittently so that the racks can be held stationary with their shelves opposite the product loading and unloading conveyors or stations for a sufficient length of time to permit horizontal loading and unloading of the shelves with conventional pusher type loading and unloading mechanisms.

A further object of the invention is to provide a system of the type described which is extremely reliable and practical in character and which has mechanically synchronized operating elements.

Other objects and advantages of the invention will be pointed out specifically or will become apparent from the following description when it is considered in conjunction with the appended claims and the accompanying drawings, in which:

FIGURE 2 is a top plan view of the apparatus shown in FIGURE 1, with certain parts being broken away and other parts being shown fragmentarily for the sake of clarity;

FIGURE 3 is an enlarged, fragmentary, side elevational view of the upper end of the elevator mechanism at one side of the machine;

FIGURE 4 is a sectional, top plan view thereof.

THE HOUSING AND ASSOCIATED STRUCTURE

Figure 1:
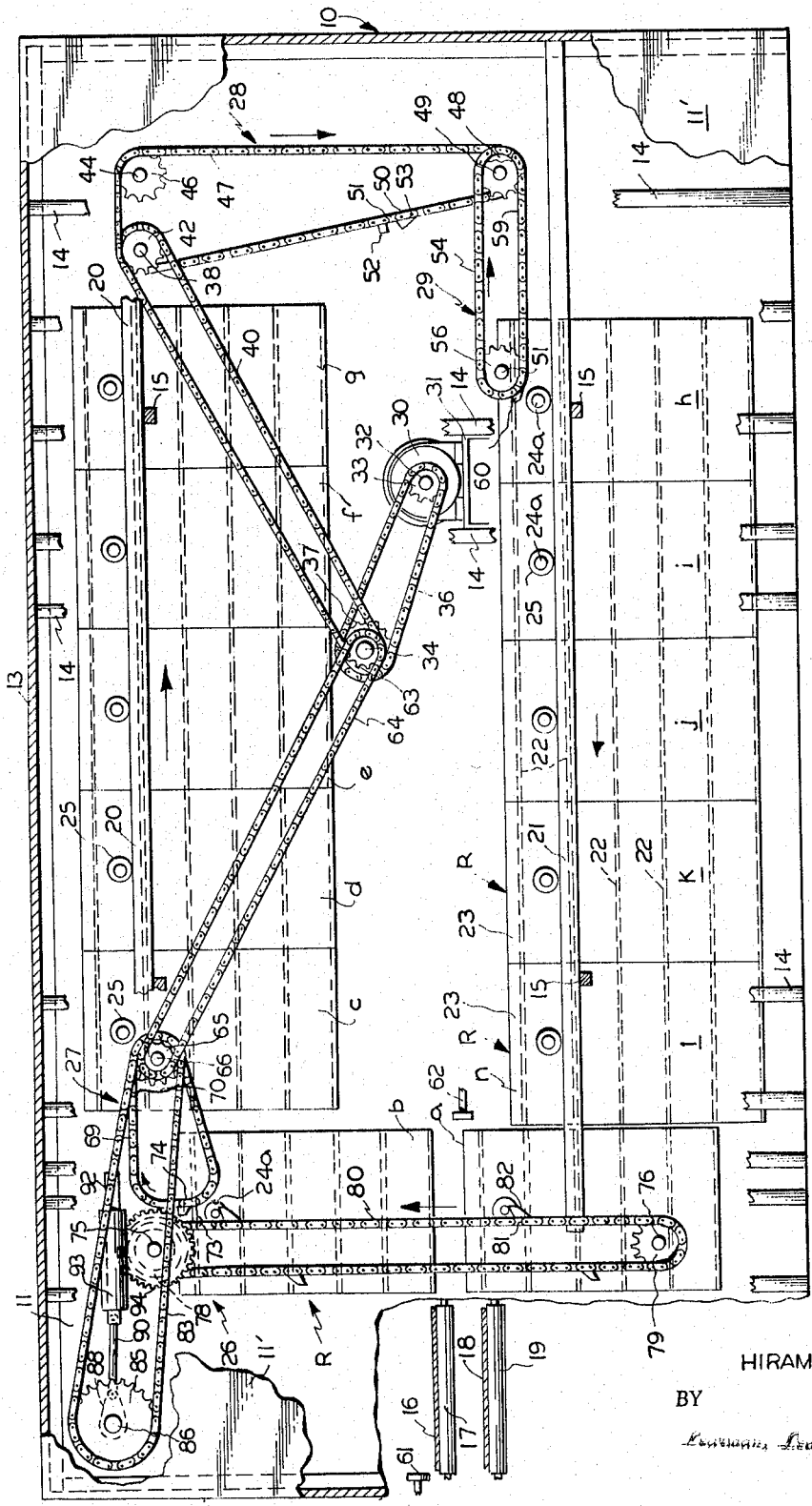
FIGURE 1 is a side elevational view of a proofer or cooler constructed in accordance with the invention and taken on the line 2—2 of FIGURE 2, the walls of the housing and certain portions of the frame being broken away to show the various operating elements, and many of the bearing and support members being omitted in the interests of clarity.

Referring now more particularly to the accompanying drawings, wherein a preferred embodiment of the invention only has been shown, a numeral 10 generally indicates an enclosure or housing which includes side walls 11, 11', end walls 12, 12', and a top wall 13, interconnected with one another by suitable means to form a cabinet supported internally by a skeleton framework including vertical and horizontal members 14 and 15, respectively. If the enclosure is to be used as a cooler, the side and end walls may be provided with suitable filter covered openings and the top wall will support a fan drawing air through the openings and circulating it through the housing. If the structure is to be used as a proofer, suitable atmosphere maintaining elements will be employed to maintain the desired humidity and temperature levels within the housing 10 in the usual manner.

Adjacent one end of the housing structure 10, at least one of the side walls (11 in FIGURE 2) will be provided with openings to admit an endless belt, product supplying conveyor 16 trained around driven rolls 17, and also an endless belt, product receiving and discharging conveyor 18 which is trained around driven rolls 19. The conveyors 16 and 18 extend in vertically spaced relation transversely into the housing 10 and define what may be termed a loading and unloading zone or station at the front end of the enclosure 10, with product support surfaces which, in the present instance, are movable transversely into and out of the housing enclosure 10.

Extending longitudinally of the housing and supported by the framework members 14 and 15 are horizontal upper and lower rails 20 and 21 at each side of the enclosure 10. The rails 20 provide an upper run or path for racks or carriers R traveling from left to right in FIGURE 1, and the rails 21 provide a lower run or path for the racks R traveling in the opposite direction. In the present instance it will be noted that each rack or shelf R includes six shelves 22 supported by side walls 23, but clearly more or fewer shelves could be provided if desired. It will be seen that the vertical space between the upper surfaces of conveyor belts 16 and 18 is the same as the vertical space between the upper surfaces of a pair of vertically adjacent shelves. Each of the material carriers or racks R is identical and a plurality of them a–l are shown. Secured to the sides 23 of each of the racks R are shafts 24 on which flanged wheel or roller members 25 are journaled in position to engage and travel along the pairs of upper and lower rails 20 and 21, and it will be observed that the shafts 24 include reduced ends 24a which project laterally beyond the rails 20 and 21.

THE DRIVE AND RACK CONVEYING MECHANISMS

The rack conveying mechanism is best disclosed in FIGURES 1 and 2 and includes an elevator mechanism generally designated 26 at the front end of the housing or enclosure 10, an upper run rack advancing conveyor mechanism generally indicated at 27, a lowerator mechanism generally indicated at 28, and a lower run rack advancing conveyor mechanism generally indicated at 29. Each of the rack conveying units 26–29 is driven by a single, continuously operating electric motor 30 which may be supported on a motor stand 31 between vertical frame members 14. The armature shaft 32 of the motor 30 mounts a sprocket 33 which drives a main drive shaft 34 which substantially spans the housing 10, as shown in FIGURE 2, the shaft 34 being journaled in bearings 35 supported on vertical frame members 14. A chain 36 trained around the motor shaft sprocket 33 is also trained around a sprocket 37 mounted on the shaft 34. The main shaft 34 drives rear jack shafts 38 journaled by bearings 39 mounted on vertical frame members 14a at each side of the housing 10 via chains 40 which are trained around sprockets 41 on the shafts 34 and 42 on the shafts 38. It will be noted that the vertical supports 14a also mount bearings 43 which journal rear stub shafts 44 at each side of the housing 10 in horizontal alignment with the shafts 38.

The lowerator mechanism 28 includes, in addition to the shafts 38 and 44, sprockets 45 and 46, respectively, mounted on these shafts, and endless chains 47 trained around the sprockets 45 and 46 at each side of the enclosure 10 and around lower sprockets 48 which are fixed on lower shafts 49 supported by similar bearings from the vertical frame support members 14a. Each chain 47 of the set of chains comprising the lowerator 28 preferably is of the sprocket link type, having a plurality of special links 50 and 51 of the character illustrated in the previously mentioned Temple patent arranged at spaced intervals along the length of the chains. Each link 51 includes a projecting portion 52, whereas each link 50 comprises a generally segment-shaped element pivoted as at 53 to an adjacent chain link so as to be swingable through an arc. The manner in which these members 52 and 50 cooperate with lowerator guides (not shown) to effectively support a rack while it is being lowered is well described in the patent mentioned and will not be repeated. The extending shaft portions 24a on the racks R are supported between the projecting portions 52 and pivotal links 50 during the descent of a rack on the lowerator chains 47 in the usual manner.

The lower rack advancing mechanism 29 includes a set of chains 54, one on each side of the enclosure 10, which are trained around sprockets 55 mounted on the shafts 49. The chains 54 are also trained around sprockets 56 which are fixed on shafts 57 journaled in bearings 58 mounted on other vertical frame members 14. Provided on each of the chains 54, which are also conventional sprocket link chains, is a special link 59 having a rack shaft engaging lug 60. The lugs 60 on the lower rack advancing chains 54 travel around to engage the projecting shaft ends 24a of a rack R which has been deposited on the lower rails 21 by the lowerator chains 47 and operate to transport it forwardly when a rack, in the position of rack a in FIGURE 1, has moved upwardly a sufficient distance to leave a space into which another rack may be moved.

The main shaft 34 may also be used to simultaneously drive the rack loading pusher 61 and the rack unloading pusher 62. A suitable mechanism for driving these pusher elements 61 and 62 is illustrated in Gibbons Patent No. 2,931,483 and incorporated herein by reference, and it will be well understood by those skilled in the art that the Gibbons drive elements can be readily mounted on the shaft 34 or on shaft elements which are driven therefrom. Also driven from the main shaft 34 by means of sprockets 63 mounted on the ends thereof are chains 64 which are trained at their front ends around sprockets 65 mounted on front jack shafts 66 which are journaled by bearings 67 supported on other vertical frame members 14.

The upper rack advancing conveyor 27 includes pulleys 68 mounted on the shafts 66 around which the advancing chains 69, which are also conventional chains of the sprocket link type, are trained. The chains 69 also are trained around fixed chain guide plates 70 which, as shown in FIGURE 2, can be supported by braces 71 from a support bracket 72 which mounts on vertical framework members 14. Each of the upper rack conveyor chains 69 includes a special link 73 having a projecting lug 74 adapted to engage under one of the projecting shaft ends 24a of a rack R to move it upwardly the last vertical increment to the level of the upper surfaces of the rails 20 and thence to move the racks on the rails 20 rearwardly when a rack on the lowerator mechanism 28 has been lowered sufficiently to leave a space for a rack to be pushed into place.

THE ELEVATOR MECHANISM

The elevator mechanism 26 comprises pairs of upper and lower shafts 75 and 76, respectively, journaled in bearings 77 mounted on vertical framework members 14. Upper and lower sprockets 78 and 79, respectively, are fixed on the shafts 75 and 76, respectively, and elevator chains 80 are trained around these sprockets at the sides of the housing. The elevator lift chains 80, which are similarly conventional sprocket link type chains having at spaced intervals special links 81 mounting projecting rack engaging lugs 82, function to lift the racks R upwardly in steps from the lower rails 21 to the upper rails 20, as will be seen. The upper sprockets 78 are driven from the jack shafts 66 by means of chains 83 which are trained around sprockets 84 mounted on the jack shafts 66 and sprockets 85 mounted on intermediate shafts 86 which are supported by bearings 87 on vertical frame members 14. Mounted on the shafts 86 are crank arms 88 (FIGURES 3 and 4) which are pivotally connected as at 89 to connecting rod members 90, the connecting rod members being pivotally connected at their opposite ends, as at 91, to rack gears 92. Guide members 93 support the rack gears 92 for linear reciprocation and it will be seen that the teeth of the gears 92 are in mesh with the teeth of pinion gears 94 which are mounted for rotation on and relative to the elevator chain sprocket shafts 75. Pawls 95 which are pivotally mounted as at 96 on one of the radial faces of each gear 94 are adapted to be received in notches 97 provided in an indexing wheel 98 which is keyed to each shaft 75. Pivotally mounted on vertical framework members 14, as at 99, are stops 100 which also are adapted to engage in the notches 97 and which are urged to engaging position by springs 101 mounted between the stop levers 100 and brackets 102 fixed on the vertical framework members 14.

OPERATION

In operation, it will be assumed that the proofer or cooler is operating with a full complement of racks R in the closed loop and while the proofer or cooler is in operation, the motor 30 runs continuously, and the elevator lift chains 80, upper rack advancing chains 69, lowerator chains 47, and lower rack advancing chains 54, similarly are driven continuously and at carefully chosen speeds relative to the spacing of the rack engaging lugs thereon so that the circuitous travel of the racks in the enclosure 10 is properly accomplished. With the loading surface 16 and product discharging surface 18 being vertically fixed, the racks R are to be indexed upwardly a shelf at a time to dispose their shelves 22 opposite the surfaces 16 and 18 and the shelves 22 are to remain stationary for a sufficient length of time for the pusher 61 to push products onto the adjacent rack shelf 22 and the pusher 62 to push products on the adjacent rack shelf 22 to the discharging surface 18.

The intermediate shafts 86 are driven continuously by the drive chains 83 and the connecting rods 90 impart a harmonic reciprocating movement to the racks 92. In FIGURE 3, for example, continued rotation of the crank arm 88 clockwisely will draw the rack gear 92 from right to left and accordingly drive the gear 94 and the pawls 95 carried by the gear 94 counterclockwisely. This will have the effect of rotating the wheel 98 and shaft 75 clockwisely, and will raise the elevator chain 80 shown through a distance equal to the distance between the rack shelves 22. When the pawl 95 has been rotated through approximately 120° around to substantially the position occupied by the stop bar 100 in FIGURE 3, the rack 92 will have reversed its direction of travel and the gear 94 and pawl 95 will be returned clockwisely. The stop bar 100 will engage in the notch 97, which has been brought around, however, and prevent return movement of the wheel 98 and the elevator lift chain which it drives. It is during this return movement of the rack gear 92 that loading and unloading of the rack shelves 22 takes place. While the operation of only the rack bar 92 and associated elements shown in FIGURE 3 has been described, it is to be understood that the similar elements at the opposite side of the enclosure or housing operate simultaneously in the same manner. By virtue of the nature of the crank arms 88 and connecting rods 90, the acceleration of a rack from a stationary position is gradual and its deceleration to arrive at a position horizontally opposite one of the surfaces 16 or 18 is also gradual.

In this manner, the racks a and b in FIGURE 1 will be indexed upwardly a shelf at a time. By the time the rack b has been indexed upwardly a distance such that it is almost in horizontal alignment with the rack c, the lugs 74 on the upper advancing conveyor chain 69 will engage the terminal ends 24a of the rack shafts and move them upwardly to the level of the ends 24a of the racks c–g. At this time the lugs 74 will move the rack b horizontally until it occupies the position occupied by the rack c in FIGURE 1. Also, at this time the rack g will be moved to the right, in position to be engaged by the lowering lug means 52 on the lowerator chains 28. By the time the rack a has ascended in indexing steps to a position in which it clears the adjacent rack l, the lugs 60 will have been brought around on the chains 54 to engage the terminal ends 24a of the shafts 24 projecting from the rack h to move the whole lower row of racks to the left and dispose the rack l in position to be imemdiately engaged by one of the lugs 82 on each of the elevator chains 80. This movement occurs while the chains 80 are in stationary position. Movement of the racks R along the rails 20 and 21 takes place during the time the rack gears 92 are returning from left to right in FIGURE 3 and the elevator chains 80 are stationary.

It is not necessary that the system operate with a full complement of racks R, and it should be understood that the various driving chains could be so synchronized with respect to placement of the rack engaging lugs thereon and their relative speeds of travel that a rack could be omitted. Also, additional racks may be included by simply lengthening the entire apparatus, and the capacity could be further increased by employing racks R with a greater number of shelves 22. Preferably, the motor 30 will drive the system through a speed varying device which will permit the length of time the racks travel in the complete circuit to be varied in accordance with the treatment time desired for the particular product being processed.

It is to be understood that the drawings and descriptive matter are in all cases to be interpreted as merely illustrative of the principles of the invention, rather than as limiting the same in any way, since it is contemplated that various changes may be made in the various elements to achieve like results without departing from the spirit of the invention or the scope of the appended claims.

I claim:

1. Product cooling or proofing apparatus comprising: horizontal rails defining upper and lower article supporting runs; conveyor means, including endless elevator conveyor means having a generally vertically disposed run substantially connecting the ends of said rails, and lowerator conveyor means having a generally vertically disposed run connecting opposite ends of said rails; carriers with vertically spaced shelves supported on said rails and elevator and lowerator means; means on said elevator conveyor means and lowerator conveyor means for engagement and disengagement with said carriers successively to respectively lift and lower the carriers vertically from one rail to the other in a circuitous travel; and conveyor means also including horizontally extending runs with means thereon for engagement and disengagement with said carriers for moving them in end to end engagement along said rails; the means on the elevator and the lowerator means and horizontally extending runs being spaced and driven at speeds such that the carriers are moved incrementally around a circuit; vertically stationary loader surface means adjacent said elevator run for supporting products to be loaded on said shelves of the carriers; vertically stationary unloading surface means adjacent said elevator run for supporting products to be unloaded from said carrier shelves successively; drive means; elevator shaft means around which said endless elevator conveyor means is trained; intermediate shaft means mounted near the upper end of said elevator run and connected with said elevator shaft means; connecting means driven continuously by said drive means and connected with said intermediate shaft means for driving said elevator conveyor shaft means continuously; lost motion mechanism on said elevator shaft means connected with said intermediate shaft means and driving the elevator endless conveyor means in indexing movements so that the carriers being elevated on said run are moved in indexing movements to dispose shelves of the carriers stationarily adjacent the loader and unloading surfaces for short periods of time sufficient to permit loading and unloading; and means for loading products from said loader surface to said shelves and unloading products from said shelves to said unloading surface during said periods of time.

2. The combination defined in claim 1 in which said connecting means includes continuously reciprocated rack gear means in mesh with pinion gear means on said elevator conveyor shaft means.

3. The combination defined in claim 2 in which said lost motion mechanism comprises pawl members on said pinion gear means and pawl wheel means mounted for rotation on said shaft means and drivingly connected with said endless elevator conveyor means.

4. Product cooling or proofing apparatus comprising: horizontal rails defining upper and lower article supporting runs; conveyor means, including endless elevator conveyor means having a generally vertically disposed run substantially connecting the ends of said rails, and lowerator conveyor means having a generally vertically disposed run connecting opposite ends of said rails; carriers with vertically spaced shelves supported on said rails and elevator and lowerator means; means on said elevator conveyor means and lowerator conveyor means for engagement and disengagement with said carriers successively to respectively lift and lower the carriers vertically from one rail to the other in a circuitous travel; said conveyor means also including horizontally extending runs with means thereon for engagement and disengagement with said carriers for moving them in end-to-end engagement along said rails, said horizontally extending runs including advancing conveyor means at the upper end of said elevator run having horizontally traveling portions for moving said racks horizontally from the elevator conveyor means to the upper article supporting run; the means on the elevator and lowerator means and horizontally extends runs being spaced and driven at speeds such that the carriers are moved continuously around a circuit; vertically stationary loader surface means adjacent said elevator run for supporting products to be loaded on said shelves of the carriers; vertically stationary unloading surface means adjacent said elevator run for supporting products to be unloaded from said carrier shelves successively; drive means; elevator shaft means around which said endless elevator conveyor means is trained; intermediate shaft means near the upper end of said elevator run connected with said elevator shaft means; connecting means driven continuously by said drive means and connected with said intermediate shaft means for driving said elevator conveyor shaft means continuously; lost motion mechanism on said elevator shaft means connected with said intermediate shaft means and driving the elevator endless conveyor means in indexing movements so that the carriers being elevated on said run are moved in indexing movements to dispose shelves of the carriers stationarily adjacent the loader and unloading surfaces for short periods of time sufficient to permit loading and unloading; drive means also connected with said intermediate shaft means for driving said advancing conveyor continuously; and means for loading products from said loader surface to said shelves and unloading products from said shelves to said unloading surface during said periods of time.

5. The combination defined in claim 4 in which said lost motion mechanism includes a horizontally reciprocable rack gear.

References Cited by the Examiner

UNITED STATES PATENTS

| | | | |
|---|---|---|---|
| 415,684 | 11/1889 | Peckham | 74—120 X |
| 1,784,318 | 12/1930 | Swanbaum | 74—120 X |
| 1,837,605 | 12/1931 | Baker | 198—85 |
| 2,774,495 | 12/1956 | Regier | 198—135 |
| 3,168,187 | 2/1965 | Thomas et al. | 198—85 |

FOREIGN PATENTS 524,099 7/1940 Great Britain.

GERALD M. FORLENZA, *Primary Examiner.*

RAYMOND B. JOHNSON, *Assistant Examiner.*